(12) United States Patent
Hollenbeck et al.

(10) Patent No.: US 7,472,946 B2
(45) Date of Patent: Jan. 6, 2009

(54) TRUCK ARCHITECTURE

(75) Inventors: Bruce Phelps Hollenbeck, Orefield, PA (US); Donald Ashley Hoey, Moorooka (AU); Ruben Perfetti, Greensboro, NC (US); Jeffery Robert Cotner, Macungie, PA (US); David Peter Onopa, Allentown, PA (US); Brian David Balicki, High Point, NC (US)

(73) Assignee: Mack Trucks, Inc., Allentown, PA (US)

( * ) Notice: Subject to any disclaimer, the term of this patent is extended or adjusted under 35 U.S.C. 154(b) by 115 days.

(21) Appl. No.: 11/653,626

(22) Filed: Jan. 16, 2007

(65) Prior Publication Data
US 2007/0182210 A1    Aug. 9, 2007

Related U.S. Application Data

(63) Continuation of application No. PCT/US2005/024938, filed on Jul. 14, 2005.

(51) Int. Cl.
*B62D 33/067* (2006.01)

(52) U.S. Cl. .................................. 296/190.04
(58) Field of Classification Search ............ 296/190.04, 296/190.01, 190.05, 190.06, 190.07
See application file for complete search history.

(56) References Cited

U.S. PATENT DOCUMENTS

| | | | | |
|---|---|---|---|---|
| 4,811,983 A | * | 3/1989 | Watts et al. | 296/190.05 |
| 5,101,921 A | * | 4/1992 | West et al. | 180/69.21 |
| 2002/0166707 A1 | * | 11/2002 | Palenchar et al. | 180/69.21 |
| 2004/0040762 A1 | * | 3/2004 | Beckstrom | 180/89.13 |
| 2007/0145779 A1 | * | 6/2007 | Jones et al. | 296/190.04 |

* cited by examiner

*Primary Examiner*—H Gutman
(74) *Attorney, Agent, or Firm*—Martin Farrell

(57) ABSTRACT

An improved truck architecture includes a truck frame, a cab coupled with the truck frame, and a hood. The cab has a front end and a rear end. The front end of the cab is positioned over the truck engine such that a portion of the engine is positioned beneath the cab. A device is provided for lifting and tilting the cab rearward relative to the engine to provide access to the engine. The hood is coupled with the truck frame and covers the remaining portion of the engine not covered by the cab.

17 Claims, 6 Drawing Sheets

TRUCK ARCHITECTURE

CROSS-REFERENCE TO RELATED APPLICATIONS

This application claims benefit of Provisional Application Ser. No. 60/587,508, filed Jul. 14, 2004, the disclosure of which is incorporated by reference.

BACKGROUND OF THE INVENTION

1. Field of the Invention

The present invention is generally directed to motor vehicles. More particularly, the present invention is related to an improved truck architecture for heavy trucks.

2. Description of the Related Art

Heavy trucks, also known as Class 8 vehicles in North America and Australia, or as "over 16 tonness" in most other places, are generally configured with one of two known architectures: "Conventional" and "Cab-Over-Engine" ("COE") architectures.

A heavy truck having a Conventional architecture (referenced herein simply as a "Conventional") is shown in FIG. 1. A Conventional is configured similar to that of a normal automobile. The engine compartment 102 is positioned in front of the cabin or cab 104 (i.e., in front of the driver and occupants) and is disposed completely underneath a relatively long hood 106.

A heavy truck having a COE architecture (referenced herein simply as a "COE") is shown in FIG. 2. As shown, the COE is characterized by having no hood at all, and the engine compartment 202 is positioned below the cab 204 (hence "cab-over-engine"), and therefore, the engine is positioned underneath the driver. As a result, COE's are much shorter in length than Conventionals and can maximize cargo capacity while complying with shorter overall length regulations in most parts of the world. That is, in most parts of the world, an overall length restriction covers the combined length of the vehicle plus the trailer, and therefore, a shorter vehicle (e.g., a COE truck) can pull a longer trailer than a longer vehicle (e.g., a Conventional).

However, in North America, length restrictions are based upon the length of a trailer and not the overall length of the vehicle plus the trailer. As a result, Conventionals dominate the commercial trucking landscape in North America.

Conventionals are preferred over COE's for a number of reasons. First, Conventionals are generally safer than COE's due to the hood in front of the cab design (forward engine compartment), which provides good crash protection for the occupants of the truck. Second, the ride is smoother due to a longer wheel base and a driver's position being between the front and rear wheels, as opposed to a COE, which has a shorter wheelbase and wherein the drive is positioned over the front wheels. Third, the design of a Conventional is a simpler design than that of COE and therefore, a Conventional is less costly to maintain.

For example, in a COE, the entire cab must be tilted forward for servicing of the engine and other vehicle components. This necessitates a more complex system to route control lines to the cab interior around a pivot point and for disconnecting the cab mounting at the rear of the vehicle. Whereas, in a Conventional, the hood provides good access to the engine compartment and to most vehicle components, and does not require such complex systems.

Because of the numerous advantages that a Conventional has over a COE, a Conventional is almost always preferred to the COE except when complying with international overall length regulations. Therefore, there is a need for new and improved truck architectures that improve over the known COE architecture, which provide a shorter overall length than a Conventional architecture yet avoid the disadvantages of a COE architecture.

SUMMARY OF THE INVENTION

As a result of the present invention, numerous non-limiting advantages over the prior art can be achieved. For example, the present invention can improve forward visibility over the truck radiator/cooling package as a result from a higher relative position of the cab to the cooling system. The present invention allows the capability for a narrower truck cab, by eliminating the need to provide lateral space for an engine "doghouse", that requires the driver and passenger to be moved further outboard from the center-line of the cab. A narrow cab can allow for improved lateral visibility from the driver's eye ellipse (i.e.—through the side windows (door). A narrower cab can also allow for a more "stair-like" condition into and out of the cab (with a wider cab, this condition becomes more "ladder-like" when viewed from front or rear view). The present invention can result in a reduced vehicle weight—the narrower cab results in a proportionally lighter and less expensive cab-in-white structure.

In accordance with an embodiment of the present invention, a new truck architecture is provided that combines the advantages of Conventional truck architectures with the ability of Cab-Over-Engine (COE) architectures to maximize cargo capacity. According to embodiments of the invention, the truck includes a hood positioned in front of the driver like that of a Conventional architecture. However, the cab is disposed further forward than traditionally for the Conventional architecture, and is mounted above a portion of the engine.

The invention further includes a cab lift-and-tilt mechanism for engine servicing. The mechanism allows the cab to be tilted rearward slightly, to allow access to the rear of the engine. The front of the engine is accessible via the hood, such as by tilting the hood. The cab need not be tilted to the full extent of a COE truck because the rear of the engine is accessible by only a slight movement of the cab.

According to an embodiment of the present invention, a truck architecture includes a truck frame, a cab coupled with the truck frame, and a hood. The cab has a front end and a rear end. The front end of the cab is positioned over the truck engine such that a portion of the engine is positioned beneath the cab. Means is provided for lifting and tilting the cab rearward relevant to the engine, to provide access to the engine. The hood is coupled with the truck frame and covers the remaining portion of the engine not already covered by the cab.

According to another embodiment of the present invention, a method is provided for configuring a truck. An engine is mounted upon a truck frame. A cab is pivotally mounted to the truck frame such that the cab at least partially covers the engine and so that the cab can be tilted rearward to provide access to the portion of the engine covered thereby. A hood is mounted over a remaining portion of the engine not covered by the cab.

According to another embodiment of the present invention, a truck architecture includes a truck cab, a truck hood, and an engine compartment disposed beneath the truck cab and the truck hood. The truck cab is tiltable in a rearward direction relative to the engine, and the hood is tiltable in a forward direction relative to the engine compartment, such that by tilting the cab rearward and the hood forward, access is provided to approximately the entire engine compartment.

Further applications and advantages of various embodiments of the present invention are discussed below with reference to the drawing figures.

DETAILED DESCRIPTION OF THE PREFERRED EMBODIMENTS

Figure 1:
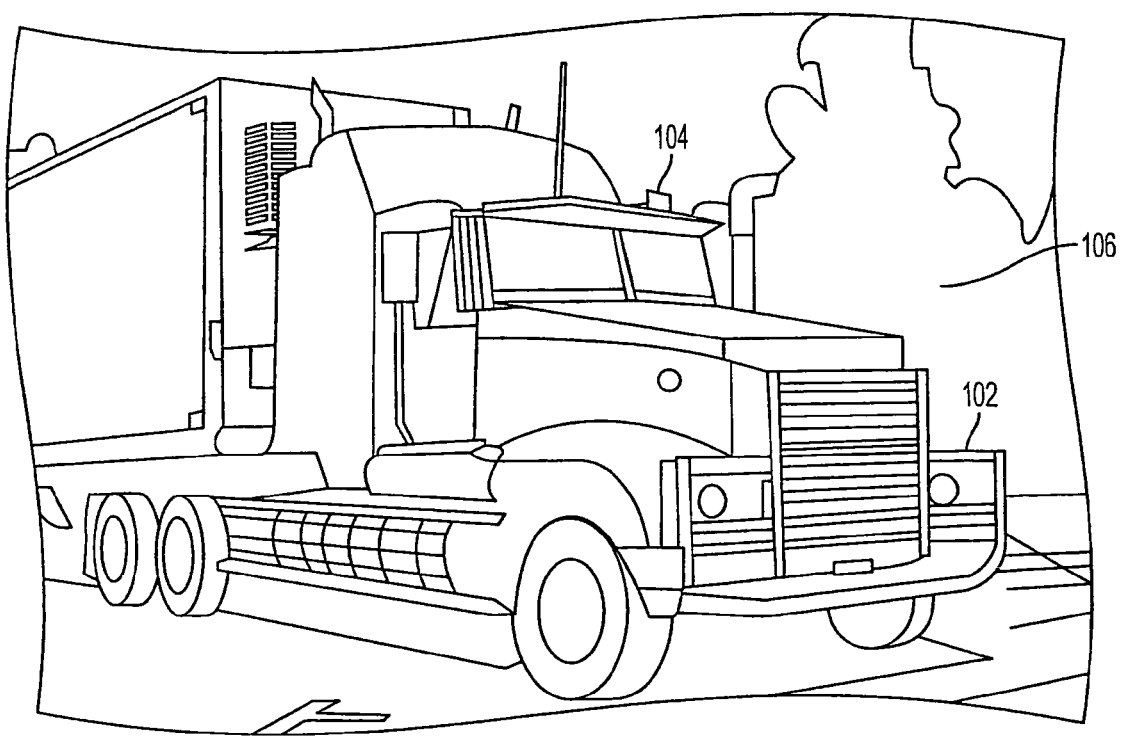
FIG. 1 is a perspective view of a truck having a Conventional architecture.
Figure 2:
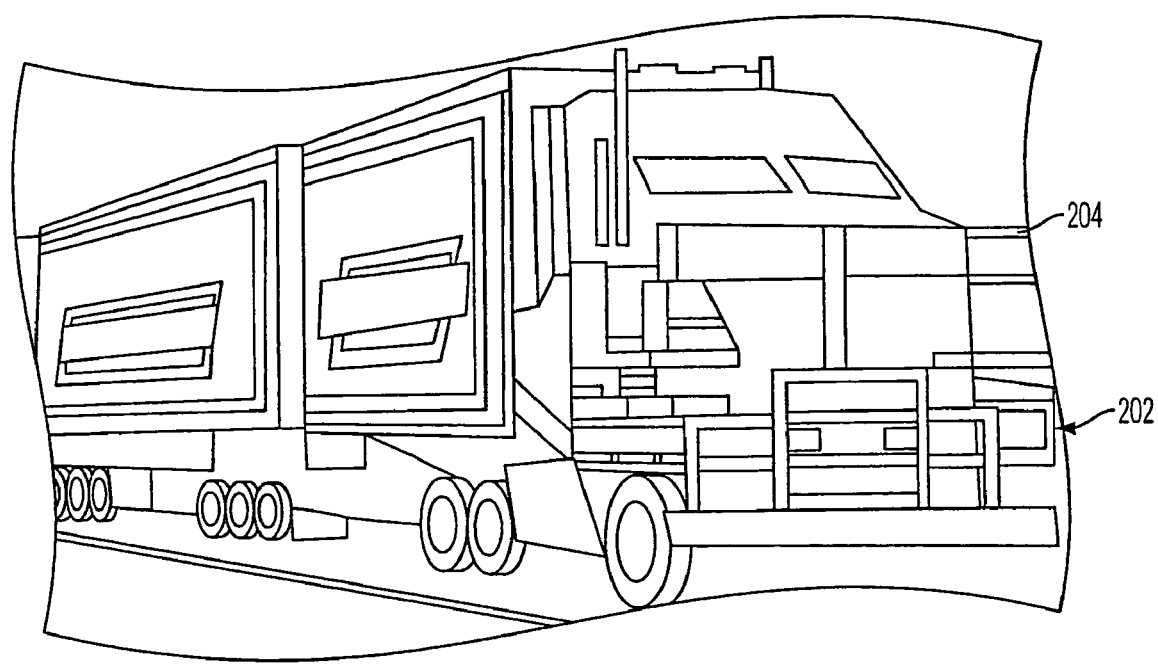
FIG. 2 is a perspective view of a truck having a COE architecture.
Figure 3:
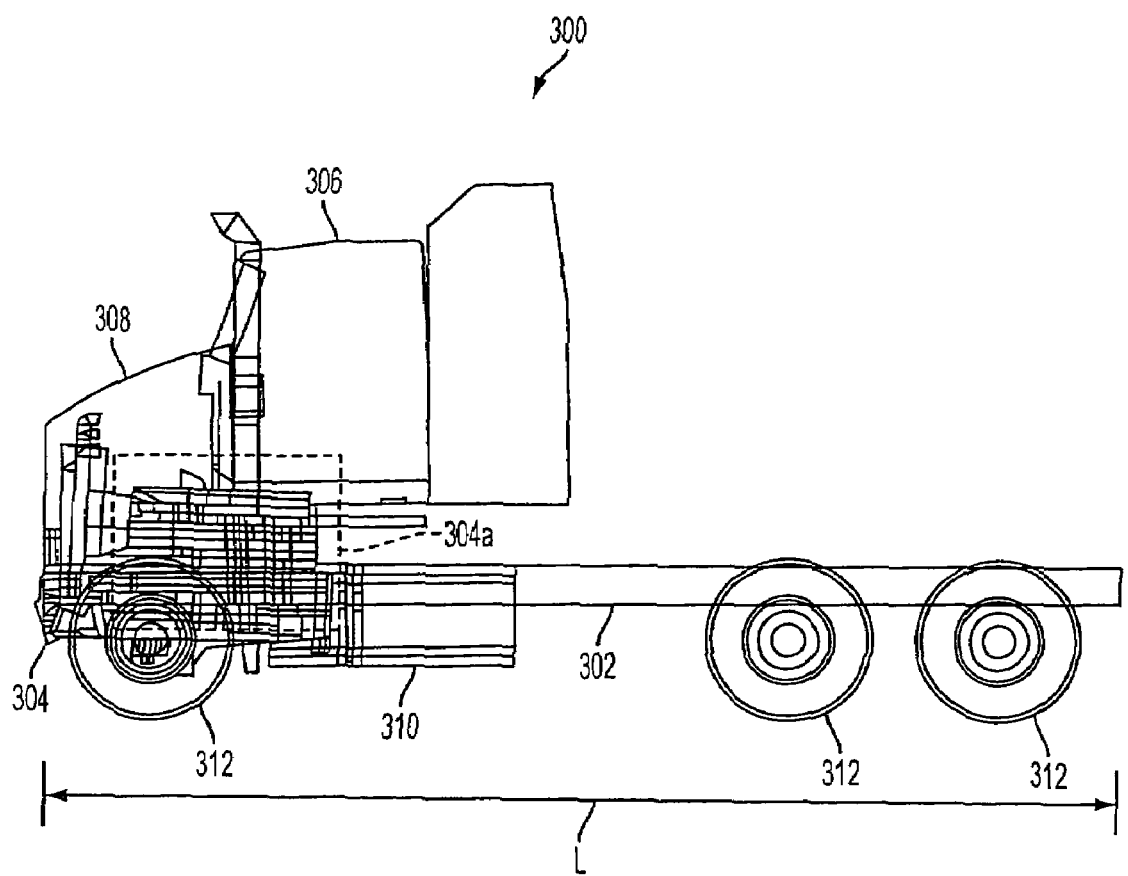
FIG. 3 is a schematic side view of an improved truck architecture according to an embodiment of the present invention.

FIG. 3 is a side view of an improved truck architecture according to an embodiment of the present invention. Truck 300 includes a truck frame 302, an engine 304, a cab 306, a hood 308, gas tanks 310 and wheels 312. Various components such as drive shaft, gearing, etc. are not shown in order to simplify the drawing.

The engine 304 is mounted to the frame 302 by conventional means. As can be seen, the hood 308 is positioned forward of the cab 306 but does not entirely cover the engine 304. A portion of the engine 304 is also positioned underneath the cab 306 (and driver (not shown)). Thus, the engine compartment 304a is formed under both the hood 308 and the cab 106. The engine is positioned such that approximately twenty-five percent to seventy-five percent of the engine is positioned under the cab, preferably, approximately fifty percent. As a result, the overall length L of the truck 300 can be shortened as compared to that of a Conventional. However, the advantages of having a hood are achieved—good access to the engine compartment is still provided via the hood 308 and the attendant crash protection is provided to the truck occupants as well. The hood 308 is preferably forward tilting.

Figure 4A:
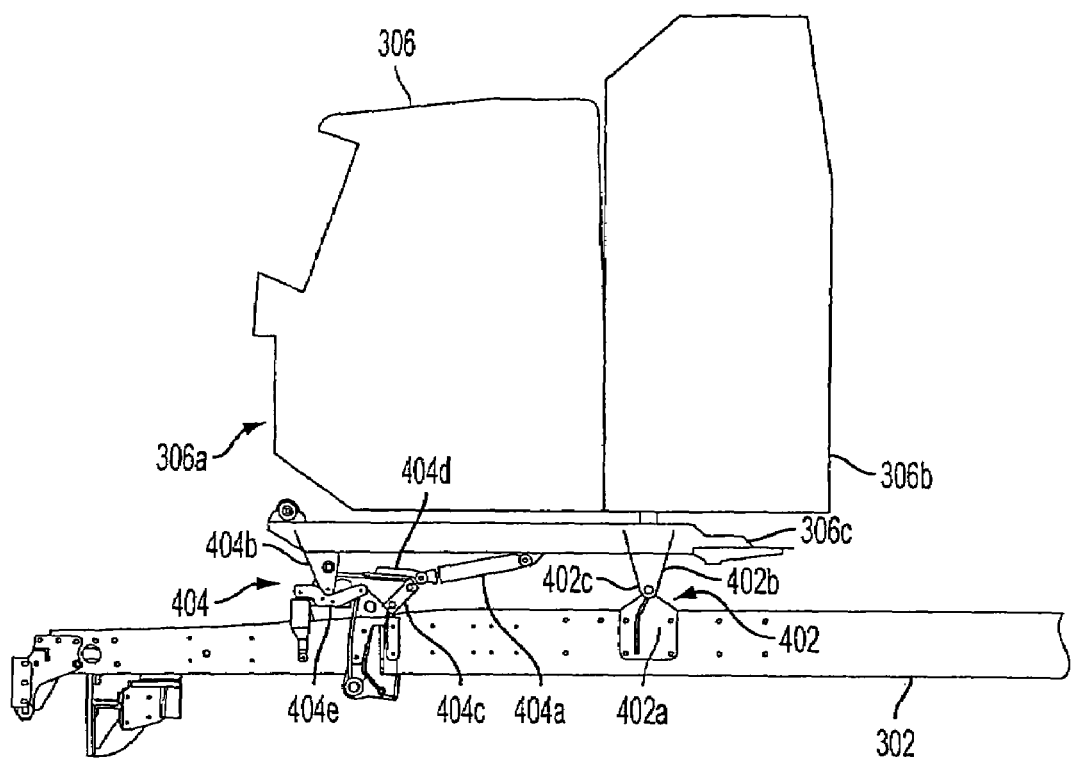
FIGS. 4a-4b are schematic views of a cab mounting and servicing system according to an embodiment of the present invention.
Figure 4B:
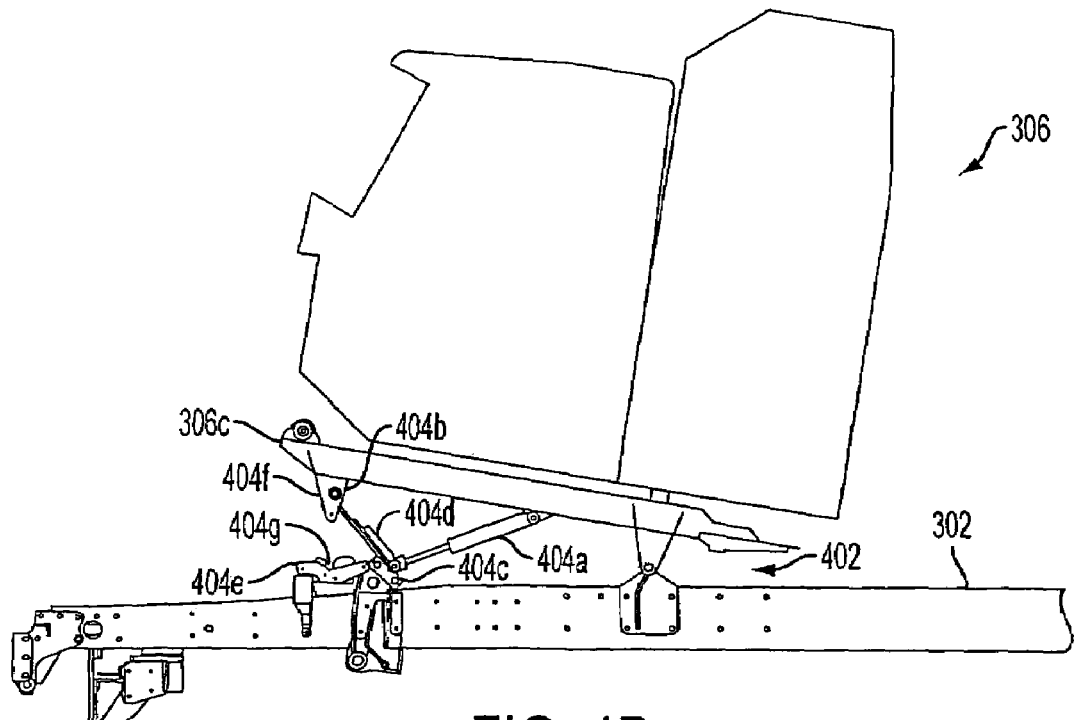

In order to access the entire engine compartment, however, it is necessary to provide means for accessing the portion underneath cab 306. Referring to FIGS. 4a-4b, one exemplary means is shown and will now be described.

The cab 306 can be mounted to the frame via pivoting means 402 and lifting means 404. Accordingly, as shown in FIGS. 4a-4b, the cab 306 can be lifted up and tilted towards the rear of the truck to provide access to the engine compartment.

As shown, pivoting means 402 can be positioned towards the rear 306b of the cab 306, and can include a mount 402a secured to the truck frame 302 and a coupling 402b secured to the cab 306 (as shown, to a cab frame portion 306c). The mount 402a and coupling 402b can be pivotably connected, such as by a pin 402c or the like.

Lifting means 404 can be mounted to the truck frame 302 at a position towards the front 306a of the cab 306, and to the cab 306 (as shown, to a cab frame portion 306c). Lifting means 404 can include a hydraulic lifting mechanism or the like. Since the present invention includes a hood 308, which provides good engine compartment access, the cab 306 only needs to be tilted slightly rearward in order to provide complete access to the entire engine 304 and engine compartment 304a. Therefore, the lifting mechanism can be configured to limit the amount which the cab 306 can be tilted. For example, as illustrated in FIG. 4a and FIG. 4b, a three part mechanism could be used to ensure safe tilting of the cab 306.

As shown, a hydraulic device 404a is coupled on a first end with the cab frame 306c at a position between a forward coupler 404b and pivot means 402. The second end of the hydraulic device 404a is coupled with a first end of a pivoting member 404c. An extension 404d is coupled with the forward coupler 404b at a first end and, at a second end, with the first end of the pivoting member 404c.

As shown in FIG. 4b, when the hydraulic device 404a is actuated to an extended position, the pivoting member 404c pivots toward the front of the cab 306 and forces the extension 404d to move forward as well, which in turn, lifts the front end 306a of cab 306 and tilts cab 306 rearward about pivoting means 402.

A cradle or anchoring means 404e can be provided for securing cab 306 via forward coupler 404b when cab 306 is in the untilted or level position. As shown, the coupler 404b may include a pin 404f which rests in a slot 404g (e.g., formed by rubber bushings or the like) in anchoring means 404e.

Figure 5A:
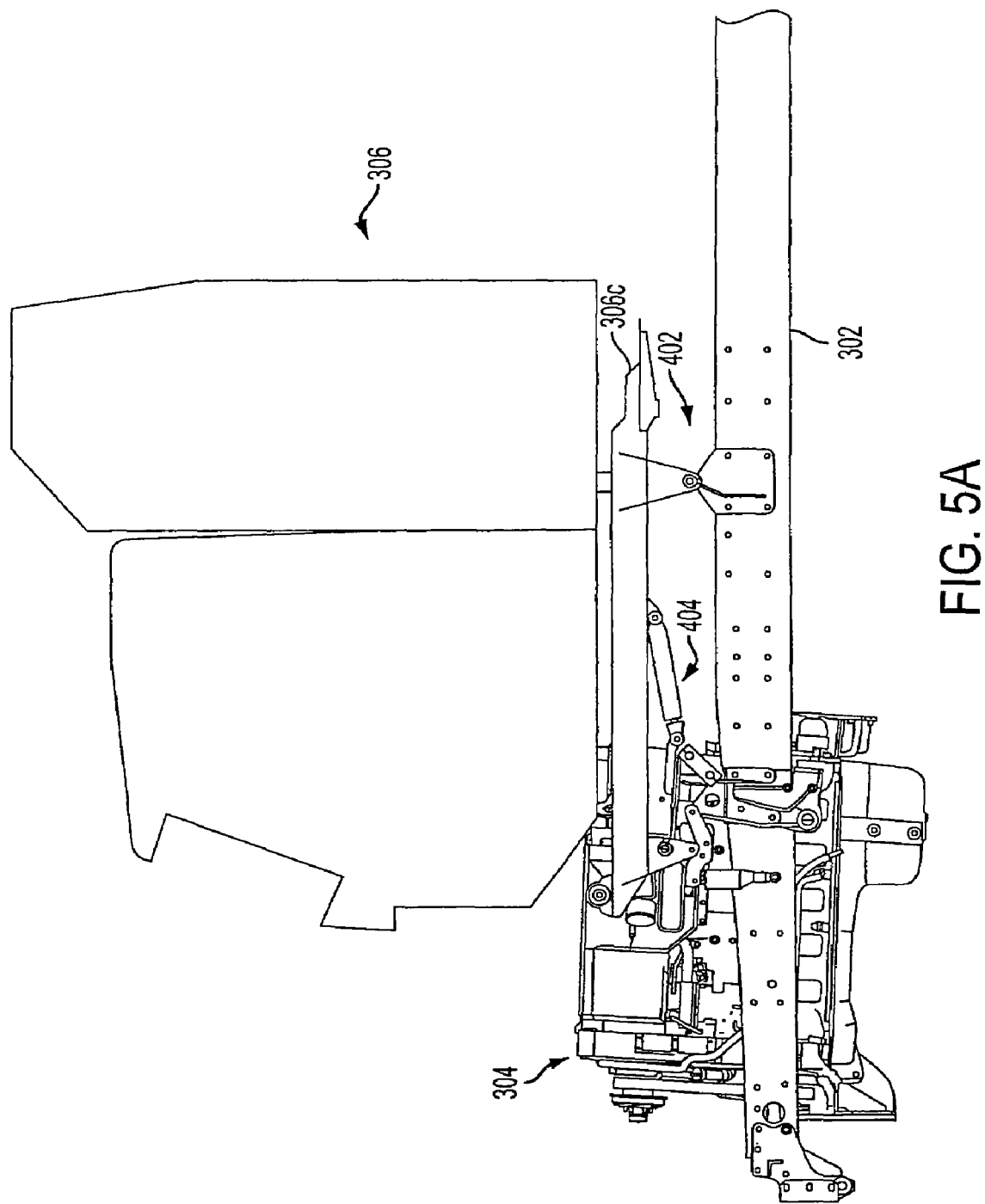
FIGS. 5a-5b are schematic views of a cab mounting and servicing system according to an embodiment of the present invention.
Figure 5B:
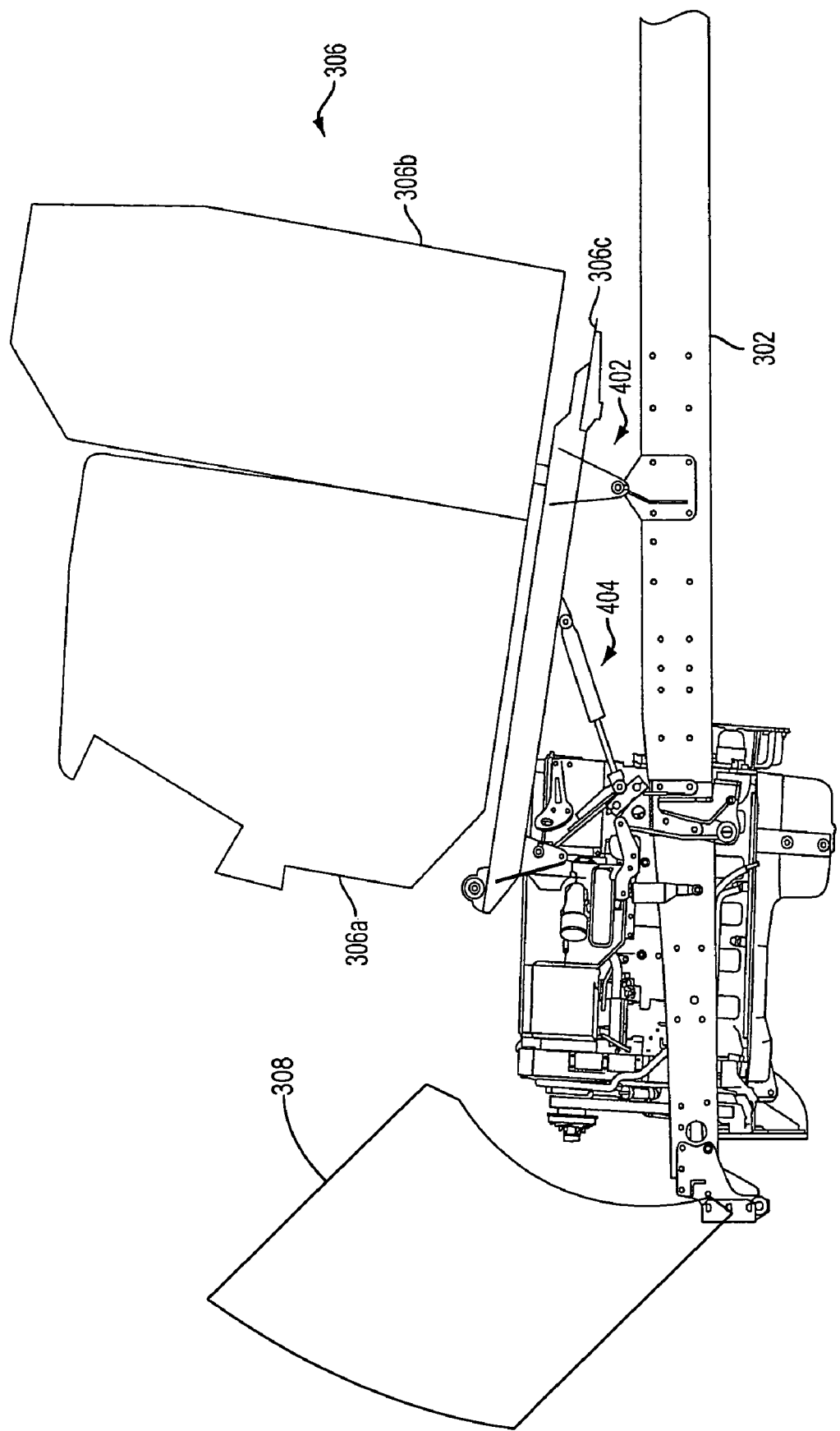

FIGS. 5a-5b show the cab and lifting and tilting mechanism of FIGS. 4a-4b, with the engine in place. As shown in FIG. 5b, when the cab 306 is tilted even only slightly rearward, and the hood 308 is tilted forward, good access to the rear portion of the engine 304 is provided. When the cab 306 is tilted until the forward part 306a of the cab is above the top of the engine, good access is achieved. Preferably, the tilt angle of the cab 306 is limited to approximately 10-15 degrees. Further, the forward portion of the engine 304 is always accessible via the hood 308 without having to tilt the cab 306.

Accordingly to one embodiment of the invention, the cab lift tilt mechanism is configured to align the cab 306 "over center" in the fully raised position, such that the cab 306 cannot fall back down without being powered down on the tilt ram.

One skilled in the art will readily understand that the lifting and tilting mechanism can be fabricated out of appropriate materials, such as steel, aluminum or the like. Further, the invention is not intended to be limited to the three part mechanism shown in FIGS. 4a-5b, and other lifting and tilting mechanisms are contemplated. Further, the present invention is not meant to be limited to any type of engine or drive train configuration, although a conventional engine configuration is shown in the figures.

Thus, a number of preferred embodiments have been fully described above with reference to the drawing figures. Although the invention has been described based upon these preferred embodiments, it would be apparent to those of skilled in the art that certain modifications, variations, and alternative constructions would be apparent, while remaining within the spirit and scope of the invention.

We claim:

1. A truck architecture for a truck having an engine, said architecture comprising:
    a truck frame;
    a cab coupled with the truck frame, said cab having a front end and a rear end, said front end of said cab being positioned over said engine such that a portion of said engine is positioned beneath said cab;
    means for lifting and tilting said cab rearward relative to said engine to provide access to said engine; and
    a hood coupled with said truck frame and covering a remaining portion of said engine not covered by said cab.

2. The truck architecture as recited by claim 1, wherein:
said hood is coupled with said truck frame such that said hood is tiltable forward to allow unobstructed access to a forward portion of said engine.

3. The truck architecture as recited by claim 1, wherein:
said means for lifting and tilting comprises:
means for pivotably coupling a rear portion of said cab with said truck frame; and
means for coupling a forward portion of said cab with said truck frame and for lifting the forward portion of said cab thereby tilting said cab about said means for pivotably coupling a rear portion of said cab.

4. The truck architecture as recited by claim 3, wherein:
said means for coupling a forward portion of said cab with said truck frame and for lifting the forward portion of said cab includes a hydraulic lifting mechanism.

5. The truck architecture as recited by claim 3, wherein:
said means for coupling a forward portion of said cab with said truck frame and for lifting the forward portion of said cab comprises a three-part mechanism for lifting said forward portion of said cab and anchoring means for securing said cab when said cab is in a level position.

6. The truck architecture as recited by claim 1, wherein:
approximately one half of said engine is positioned underneath said cab when said cab is in a level position.

7. The truck architecture as recited by claim 1, wherein:
said means for lifting and tilting said cab prevents said cab from tilting beyond a predetermined point.

8. The truck architecture as recited by claim 7, wherein:
said means for lifting and tilting said cab limits tilting of said cab beyond approximately a position wherein said front end of said cab is approximately positioned at a top side of said engine.

9. The truck architecture as recited by claim 1, further comprising:
a cab frame upon which said cab is mounted and to which said means for lifting and tilting is coupled.

10. The truck architecture as recited by claim 9, wherein:
said means for lifting and tilting comprises:
means for pivotably coupling a rear portion of said cab frame with said truck frame; and
means for coupling a forward portion of said cab frame with said truck frame and for lifting the forward portion of said cab frame thereby tilting said cab about said means for pivotably coupling a rear portion of said cab.

11. A method for configuring a truck, comprising steps of:
mounting an engine upon a truck frame;
pivotably mounting a cab to said truck frame, said cab at least partially covering said engine such that said cab can be tilted rearward to provide access to the covered portion of said engine; and
mounting a hood over a remaining portion of said engine not covered by said cab.

12. The method as recited by claim 11, wherein a tilting and lifting mechanism is provided to lift a forward portion of said cab and tilt said cab in a rearward direction about a pivot mechanism positioned at a rear portion of said cab to provide access to the portion of said engine which is positioned beneath said cab.

13. The method as recited by claim 11, wherein said hood is pivotably mounted such that said hood is tiltable in a forward direction to provide unobstructed access to a forward portion of said engine.

14. The method as recited by claim 11, wherein said tilting and lifting mechanism prevents said cab from being tilted further than a predetermined amount.

15. A truck architecture comprising:
a truck cab;
a truck hood; and
an engine compartment disposed beneath the truck cab and the truck hood, wherein said truck cab is tiltable in a rearward direction relative to said engine compartment and said hood is tiltable in a forward direction relative to said engine compartment, such that by tilting said cab rearward and said hood forward, access is provided to approximately an entire engine compartment.

16. The truck architecture as recited by claim 15, wherein:
a rear portion of said engine compartment is accessible when said cab is tilted in the rearward direction only slightly.

17. The truck architecture as recited by claim 15, wherein:
at least twenty five percent but not more than seventy five percent of said engine compartment is disposed beneath said truck cab.

* * * * *